United States Patent
Rauch et al.

(10) Patent No.: US 12,234,773 B1
(45) Date of Patent: Feb. 25, 2025

(54) ACOUSTICALLY ABSORPTIVE LINERS FOR PASSIVE CONTROL OF UNWANTED ACOUSTIC MODES IN ROTATING DETONATION COMBUSTORS

(71) Applicant: HySonic Technologies, LLC, West Lafayette, IN (US)

(72) Inventors: Zachary Rauch, West Lafayette, IN (US); Carlo Scalo, West Lafayette, IN (US)

(73) Assignee: Hysonic Technologies, LLC, West Lafayette, IN (US)

( * ) Notice: Subject to any disclaimer, the term of this patent is extended or adjusted under 35 U.S.C. 154(b) by 0 days.

(21) Appl. No.: 18/098,575

(22) Filed: Jan. 18, 2023

Related U.S. Application Data

(60) Provisional application No. 63/300,339, filed on Jan. 18, 2022.

(51) Int. Cl.
| | |
|---|---|
| *F02C 7/24* | (2006.01) |
| *F02C 5/02* | (2006.01) |
| *F23R 3/56* | (2006.01) |
| *F23R 7/00* | (2006.01) |

(52) U.S. Cl.
CPC .......... *F02C 7/24* (2013.01); *F02C 5/02* (2013.01); *F23R 3/56* (2013.01); *F23R 7/00* (2013.01)

(58) Field of Classification Search
CPC ...... F02C 7/24; F02C 5/02; F23R 3/56; F23R 7/00
See application file for complete search history.

(56) References Cited

U.S. PATENT DOCUMENTS

| | | | | |
|---|---|---|---|---|
| 7,076,956 B2* | 7/2006 | Young | ............... | F23M 20/005 60/725 |
| 7,089,741 B2* | 8/2006 | Ikeda | ............... | F23M 20/005 60/725 |
| 7,448,215 B2* | 11/2008 | Macquisten | ......... | F23M 20/005 60/725 |
| 7,832,211 B2* | 11/2010 | Ikeda | ............... | F23R 3/04 60/725 |
| 7,857,094 B2* | 12/2010 | Macquisten | ......... | F23M 20/005 60/725 |
| 7,926,278 B2* | 4/2011 | Gerendas | ............ | F23R 3/002 60/725 |
| 8,127,546 B2* | 3/2012 | Park | ............... | F23M 20/005 60/725 |
| 8,146,364 B2* | 4/2012 | Johnson | ............ | F23R 3/002 60/725 |
| 8,635,874 B2* | 1/2014 | Eroglu | ............ | F23M 20/005 60/725 |
| 8,973,365 B2* | 3/2015 | Corr | ............... | F23R 3/44 60/725 |

(Continued)

*Primary Examiner* — Jesse S Bogue
(74) *Attorney, Agent, or Firm* — ICE MILLER LLP

(57) ABSTRACT

Rotating Detonation Combustors (RDCs)—or Rotating Detonation Engines (RDEs)—are special propulsion devices that generate thrust by burning a fuel-oxidizer mixture via a rotating detonation wave, rather than a traditional flame. RDCs may exhibit unwanted secondary acoustic disturbances that negatively affect their detonative operation. Suppressing such unwanted/secondary acoustic modes associated with the main detonation wave may be achieved by an acoustically absorptive lining mountable in the internal walls of a RDC.

27 Claims, 16 Drawing Sheets

(56) References Cited

U.S. PATENT DOCUMENTS

| | | | |
|---|---|---|---|
| 10,125,987 B2* | 11/2018 | Tonon | F23M 20/005 |
| 11,131,456 B2* | 9/2021 | Dyszkiewicz | F23M 20/005 |
| 11,286,884 B2* | 3/2022 | Boardman | F23R 3/12 |
| 2006/0123791 A1* | 6/2006 | Macquisten | F23R 3/50 |
| | | | 60/725 |
| 2007/0283700 A1* | 12/2007 | Gerendas | F23R 3/06 |
| | | | 60/725 |
| 2021/0108801 A1* | 4/2021 | Singh | F23R 3/002 |

* cited by examiner

ACOUSTICALLY ABSORPTIVE LINERS FOR PASSIVE CONTROL OF UNWANTED ACOUSTIC MODES IN ROTATING DETONATION COMBUSTORS

CROSS-REFERENCE TO RELATED APPLICATION

The present application is a non-provisional of, and claims priority to, U.S. Provisional Patent Application No. 63/300,339, filed Jan. 18, 2022, and having the title "ACOUSTICALLY ABSORPTIVE LINERS FOR CONTROL OF UNWANTED ACOUSTIC MODES IN ROTATING DETONATION COMBUSTORS," the disclosure of which is incorporated by reference in its entirety.

STATEMENT REGARDING FEDERALLY SPONSORED RESEARCH

The inventions disclosed herein were made with government support under Phase I Small Business Technology Transfer Contract No. N6833521C0407 awarded by the Office of Naval Research. The government has certain rights in the invention.

BACKGROUND

Rotating Detonation Combustors (RDCs), also known as Rotating Detonation Engines, are special propulsion devices that generate thrust by burning a fuel oxidizer mixture via a rotating detonation wave rather than a traditional flame. RDCs are among the front runners in propulsion technology for hypersonic vehicles, characterized by their potential to achieve flight speeds exceeding 5 times the speed of sound (Mach 5). More specifically, RDCs have gained research interest as a result of their potential benefits to both airbreathing and rocket applications, such as conventional turbojet augmenters or air-to-air missile systems. Finally, RDCs are attractive due to their high-power density, high combustion efficiency, and compact packaging.

Much of the promise offered by RDCs is rooted in their Pressure Gain Combustion (PGC) nature. PGC is an average total pressure increase as a result of an unsteady combustion process in a constrained environment. This implies that the power density of an RDC is much higher than a conventional combustor, as the ability to generate work (i.e., thrust) is greater due to the unsteady, constrained combustion process.

A detonation wave is simply a supersonic combustion wave: a shock propagating and burning through a region of unburned reactants (i.e., a fuel and an oxidizer). Ignition of these unburned reactants is caused by the compression associated with the shock. The energy release from the ignited region (or reaction zone) sustains the propagation of the shock wave itself, creating a two-way coupling that characterizes it as a detonation wave.

In RDCs, a detonation wave travels azimuthally around an annular chamber and the average total pressure increases axially due to the constrained unsteady combustion. This means that the total pressure exiting the combustor is greater than the total pressure which entered the combustor. Since thrust is created by utilizing the total pressure available to expand an exhaust flow, the increase in total pressure in an RDC directly implies its ability to generate more thrust. This is a very important benefit of RDCs, as conventional deflagrative combustion devices, such as the ones powering commercial aviation vehicles, are isobaric (i.e. static pressure remains constant during combustion). Therefore, for the same reactant mixture pressures, an RDC could theoretically generate more thrust than a conventional combustor. While it is difficult to quantify exactly how much combustion efficiency can be achieved via the PGC aspect of RDCs, the assumption of 10% total pressure increase is considered an acceptable approximation.

Detonation combustion devices offer three major theoretically recognizable benefits:

(1) Detonations are not nearly as reliant upon complete mixing of reactants. In addition, secondary flow effects such as product gas recirculation and the formation of vortices along sliplines are intrinsic to the structure of detonation waves, which directly promote mixing without any additional length requirements.

(2) Detonation waves consume nearly all fuel and oxidizer quickly behind the shock front. The theoretical ability of detonations to retain this higher combustion efficiency at high-speed flight conditions is what makes them particularly attractive combustion devices for hypersonic propulsion systems.

(3) Because of the reduced length and volume required for a detonation wave to consume all reactants, RDCs can be much smaller than ordinary deflagrative combustors. Only a fraction of the volume is required to produce the same power output as a deflagrative combustor, which increases the combustor power density. This leads directly to the final realizable benefit of RDC, which is the dramatic reduction in axial length required to completely consume all reactants, allowing RDCs to maintain their very compact packaging.

High combustion efficiency and power density are clear benefits of RDCs. However, a phenomenon as powerful as a detonation can trigger undesired flow effects that may prevent implementation of RDCs in real propulsion devices. One of the primary issues is the generation of unwanted acoustic modes in the combustion chamber, which can be responsible for a decrease in combustion efficiency and, hence, performance.

Therefore, it is desired to provide devices and methods for suppressing such unwanted acoustic modes associated with the detonation wave in RDCs.

SUMMARY

The present disclosure includes disclosure of acoustically absorptive liner devices for rotating detonation combustors. In at least one embodiment, an acoustically absorptive liner device according to the present disclosure comprises a cylindrically shaped body, the cylindrically shaped body comprising an outer surface, an inner surface, a first open end, and a second open end; and a plurality of Helmholtz resonators formed in the cylindrically shaped body, the Helmholtz resonator open to the outer surface and to the inner surface thereby forming an acoustic conduit between the inner surface and the outer surface.

In at least one embodiment of an acoustically absorptive liner device according to the present disclosure, each Helmholtz resonator comprises a cylindrically shaped cavity open to the outer surface and at least one cylindrically shaped pore open at a first end to the cylindrically shaped cavity and open at a second end to the inner surface thereby forming an acoustic conduit between the inner surface and the outer surface.

In at least one embodiment of an acoustically absorptive liner device according to the present disclosure, a plurality of Helmholtz resonators are arranged in axial rows in a cylindrically shaped body.

In at least one embodiment of an acoustically absorptive liner device according to the present disclosure, axial rows of Helmholtz resonators are arranged around the full circumference of a cylindrically shaped body.

In at least one embodiment of an acoustically absorptive liner device according to the present disclosure, two adjacent axial rows of Helmholtz resonators are axially offset from each another.

In at least one embodiment of an acoustically absorptive liner device according to the present disclosure, the acoustically absorptive liner device comprises at least one first configuration Helmholtz resonator and at least one second configuration Helmholtz resonator.

In at least one embodiment of an acoustically absorptive liner device according to the present disclosure, the acoustically absorptive liner device comprises at least one first configuration Helmholtz resonator configured to dampen a first frequency.

In at least one embodiment of an acoustically absorptive liner device according to the present disclosure, the acoustically absorptive liner device comprises at least one second configuration Helmholtz resonator configured to dampen a second frequency.

In at least one embodiment of an acoustically absorptive liner device according to the present disclosure, the acoustically absorptive liner device comprises at least one third configuration Helmholtz resonator configured to dampen a third frequency.

In at least one embodiment of an acoustically absorptive liner device according to the present disclosure, the acoustically absorptive liner device comprises at least one fourth configuration Helmholtz resonator.

In at least one embodiment of an acoustically absorptive liner device according to the present disclosure, the acoustically absorptive liner device comprises a plurality of Helmholtz resonators arranged in axial rows in a cylindrically shaped body, wherein at least one first configuration Helmholtz resonator and at least one second configuration Helmholtz resonator are intermixed in the axial rows.

In at least one embodiment of an acoustically absorptive liner device according to the present disclosure, the acoustically absorptive liner device comprises a plurality of Helmholtz resonators arranged in axial rows in a cylindrically shaped body, wherein at least one first configuration Helmholtz resonator and at least one second configuration Helmholtz resonator and at least one third configuration Helmholtz resonator are intermixed in the axial rows.

In at least one embodiment of an acoustically absorptive liner device according to the present disclosure, the acoustically absorptive liner device comprises at least one first configuration Helmholtz resonator and at least one second configuration Helmholtz resonator and at least one third configuration Helmholtz resonator, which are configured to dampen at least three different frequencies.

The present disclosure includes disclosure of a rotating detonation combustor comprising an acoustically absorptive liner device, which comprises a cylindrically shaped body, the cylindrically shaped body comprising an outer surface, an inner surface, a first open end, and a second open end, and at least one Helmholtz resonator formed in the cylindrically shaped body, the at least one Helmholtz resonator open to the outer surface and to the inner surface thereby forming an acoustic conduit between the inner surface and the outer surface. In an aspect of a rotating detonation combustor according to the present disclosure, each at least one Helmholtz resonator comprises a cylindrically shaped cavity open to the outer surface and at least one cylindrically shaped pore open at a first end to the cylindrically shaped cavity and open at a second end to the inner surface thereby forming an acoustic conduit between the inner surface and the outer surface.

In at least one embodiment of a rotating detonation combustor according to the present disclosure, the rotating detonation combustor comprises a plurality of Helmholtz resonators arranged in axial rows in the cylindrically shaped body, wherein the axial rows are arranged around the full circumference of the cylindrically shaped body.

In at least one embodiment of a rotating detonation combustor according to the present disclosure, the rotating detonation combustor comprises a plurality of Helmholtz resonators, wherein each Helmholtz resonator is configured to dampen a preselected frequency.

BRIEF DESCRIPTION OF DRAWINGS

The embodiments and other features, advantages and disclosures contained herein, and the manner of attaining them, will become apparent and the present disclosure will be better understood by reference to the following description of various exemplary embodiments of the present disclosure taken in conjunction with the accompanying drawings, wherein.

DESCRIPTION

Figure 1:
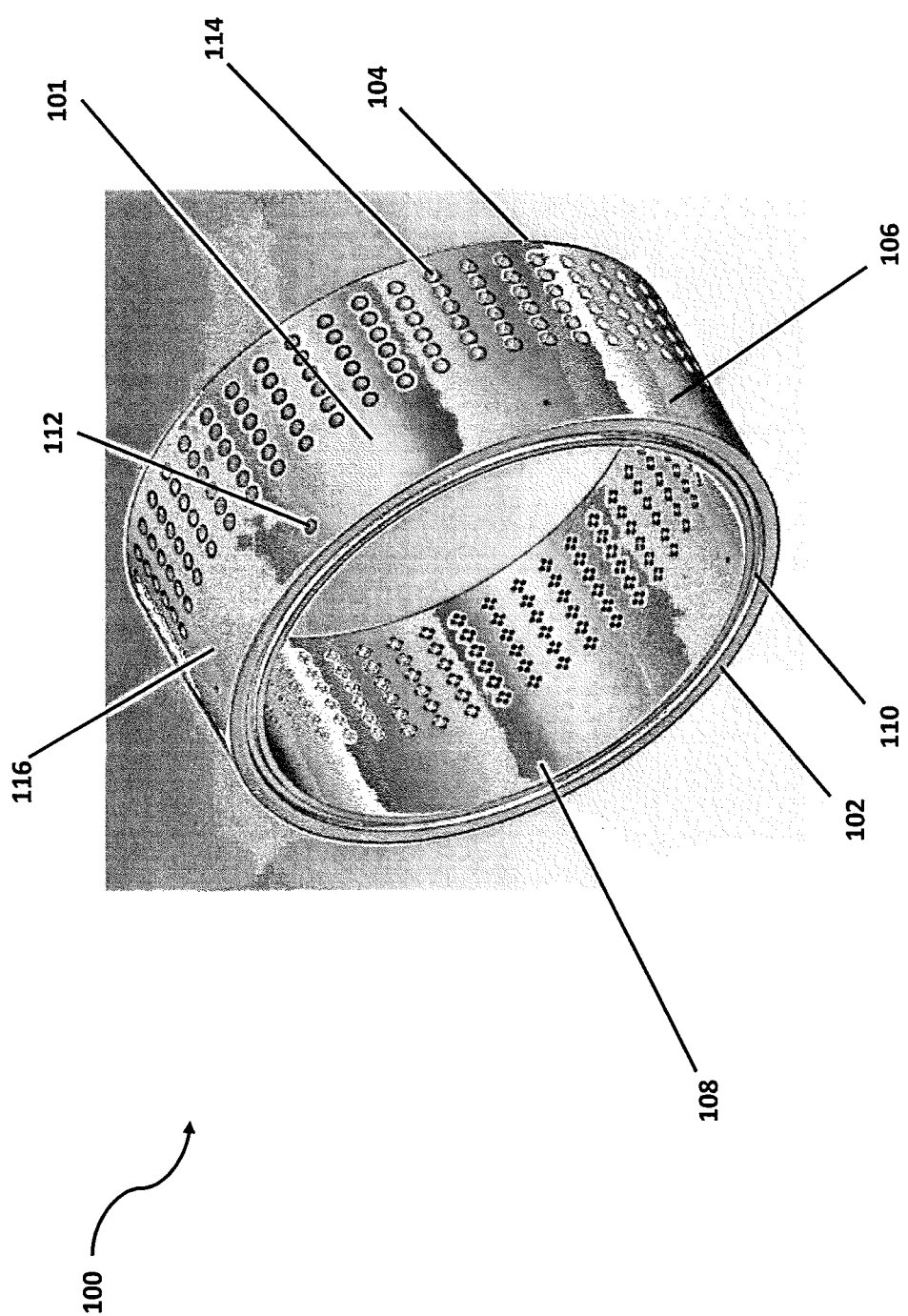
FIG. 1 shows a perspective view of an acoustic absorption liner according to at least one embodiment of the present disclosure.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

As used throughout this application, the word "may" is used in a permissive sense (i.e., meaning having the potential to), rather than the mandatory sense (i.e., meaning must). The words "include," "including," and "includes" and the like mean including, but not limited to. As used herein, the singular form of "a," "an," and "the" include plural references unless the context clearly dictates otherwise. As employed herein, the term "number" shall mean one or an integer greater than one (i.e., a plurality).

As used herein, the statement that two or more parts or components are "coupled" shall mean that the parts are joined or operate together either directly or indirectly, i.e., through one or more intermediate parts or components, so long as a link occurs. As used herein, "directly coupled" means that two elements are directly in contact with each other. As used herein, "fixedly coupled" or "fixed" means that two components are coupled so as to move as one while maintaining a constant orientation relative to each other. Directional phrases used herein, such as, for example and without limitation, top, bottom, left, right, upper, lower, front, back, and derivatives thereof, relate to the orientation of the elements shown in the drawings and are not limiting upon the claims unless expressly recited therein.

Figure 2:
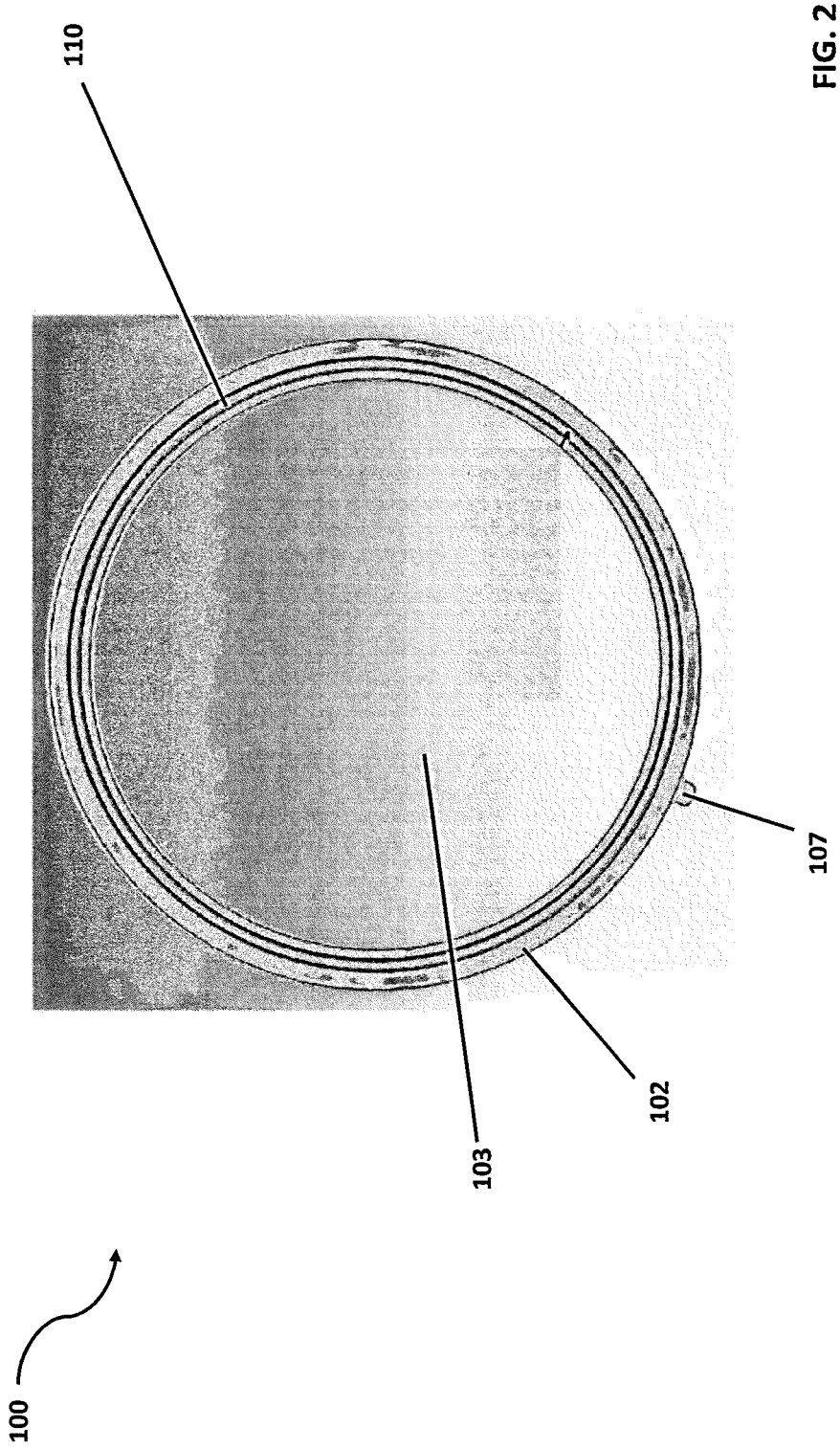
FIG. 2 shows a front view of an acoustic absorption liner according to at least one embodiment of the present disclosure.
Figure 3:
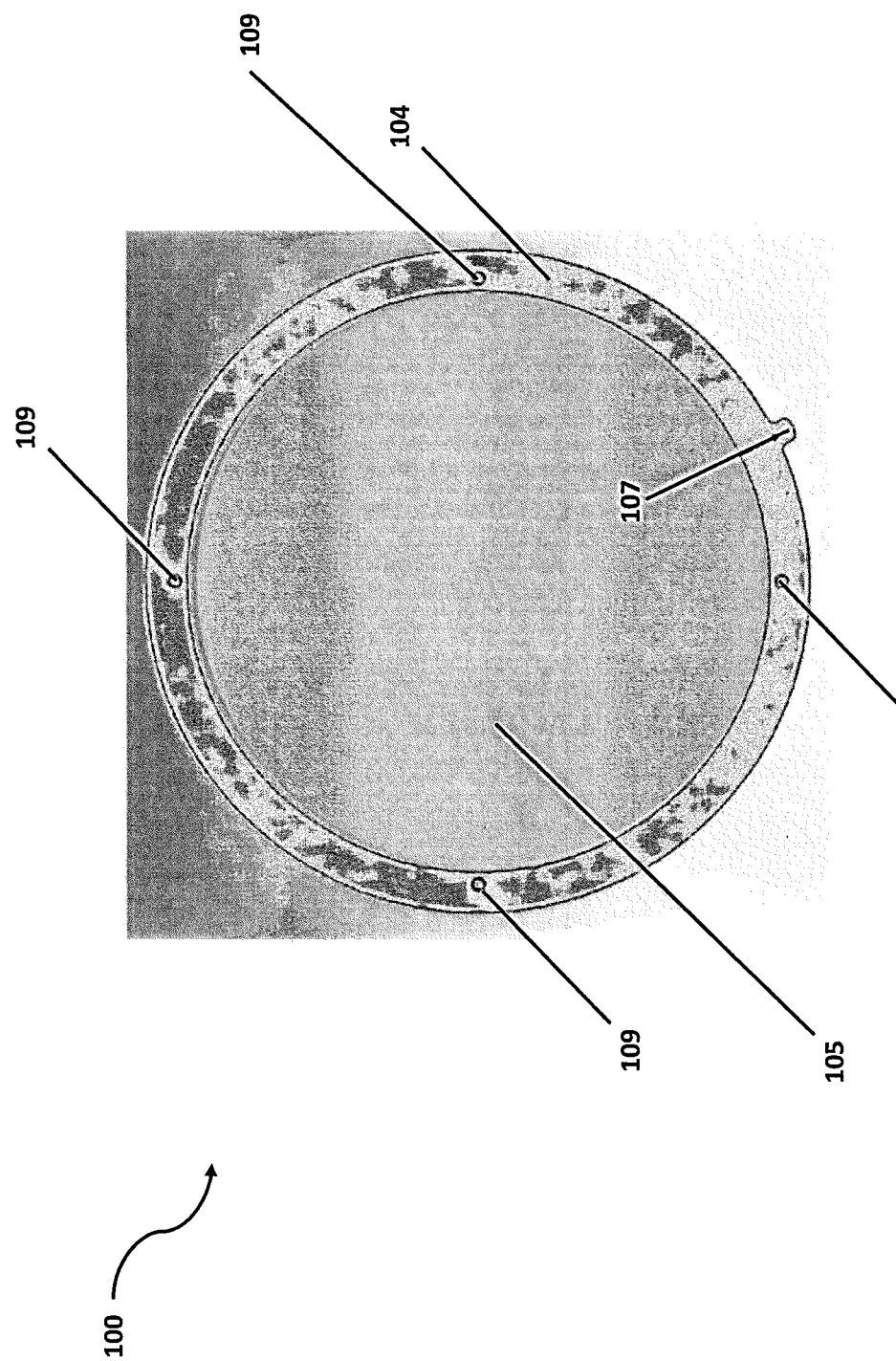
FIG. 3 shows a rear view of an acoustic absorption liner according to at least one embodiment of the present disclosure.
Figure 4:
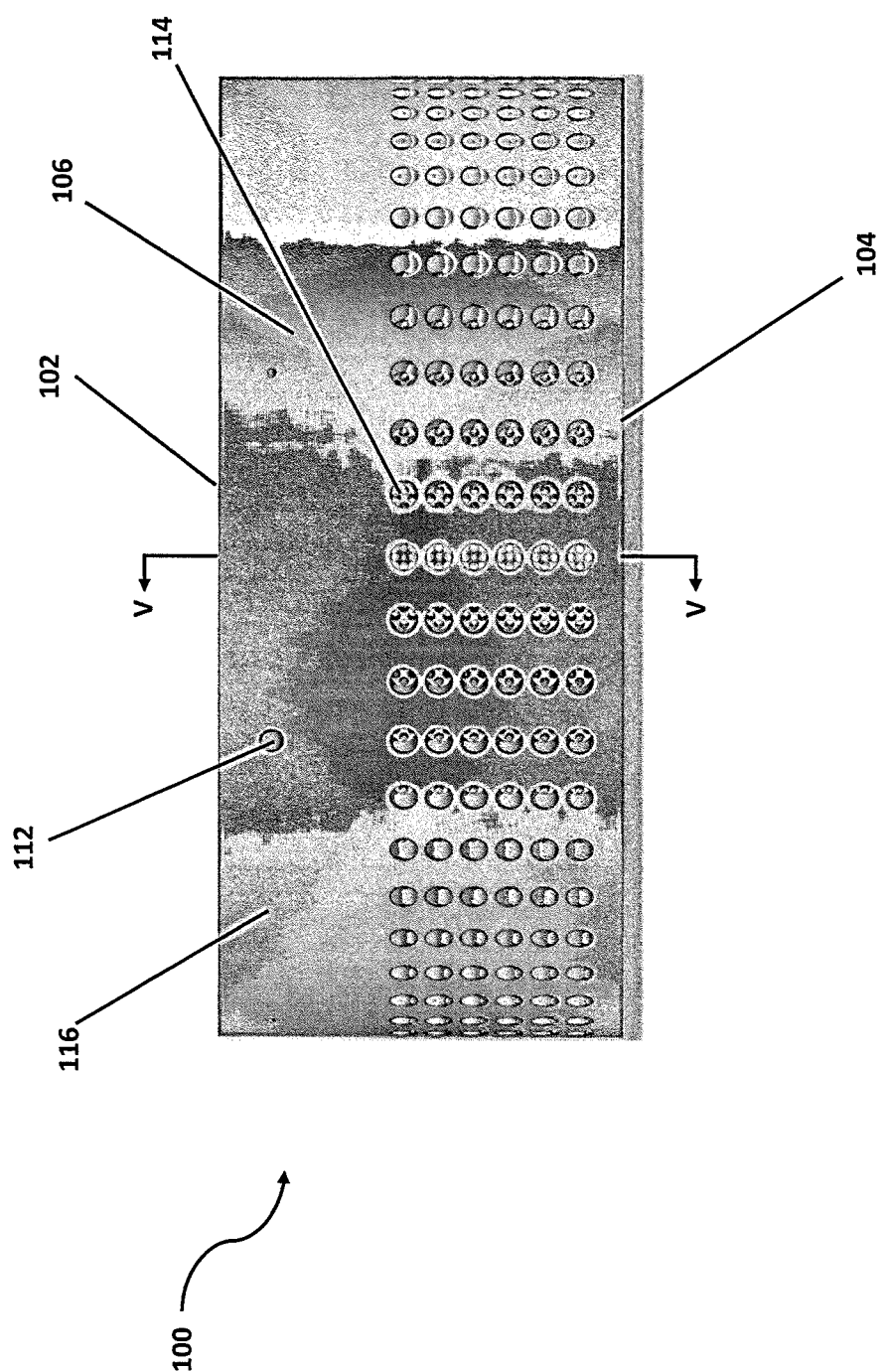
FIG. 4 shows a side view of an acoustic absorption liner according to at least one embodiment of the present disclosure.

FIG. 1 shows a perspective view of acoustic absorption liner 100 according to at least one embodiment of the present disclosure. FIG. 2 shows a front view of acoustic absorption liner 100 according to at least one embodiment of the present disclosure. FIG. 3 shows a rear view of acoustic absorption liner 100 according to at least one embodiment of the present disclosure. FIG. 4 shows a side view of acoustic absorption liner 100 according to at least one embodiment of the present disclosure.

In at least one embodiment, acoustic absorption liner 100 may comprise a substantially cylindrical body 101 comprising first rim 102 and opposing second rim 104, with outer surface 106 and opposing inner surface 108 between first rim 102 and second rim 104. In at least one embodiment, first rim 102 may comprise a circumferential groove 110, into which a gasket material such as an O-ring may later be inserted. In at least one embodiment, second rim 104 may comprise one or more threaded holes 109 distributed around the circumference of second rim 104. First rim 102 defines first opening 103. Second rim 104 defines second opening 105.

In at least one embodiment, acoustic absorption liner 100 also may comprise a plurality of axial rows of Helmholtz resonators 114 arranged around at least a portion of the circumference of acoustic absorption liner 100. In at least one embodiment, acoustic absorption liner 100 also may comprise a plurality of axial rows of Helmholtz resonators 114 arranged around the full circumference of acoustic absorption liner 100. In at least one embodiment, outer surface 106 may comprise clocking tab 107 and one or more threaded holes 112 distributed around the circumference of outer surface 106.

In at least one embodiment of acoustic absorption liner 100, the Helmholtz resonators 114 extend through body 101 between outer surface 106 and inner surface 108, and are uniform in shape and size. In at least one embodiment of acoustic absorption liner 100, a segment 116 of acoustic absorption liner 100 adjacent to first rim 102 is free of Helmholtz resonators 114. Segment 116 aids in thermal management of acoustic absorption liner 100.

Figure 5:
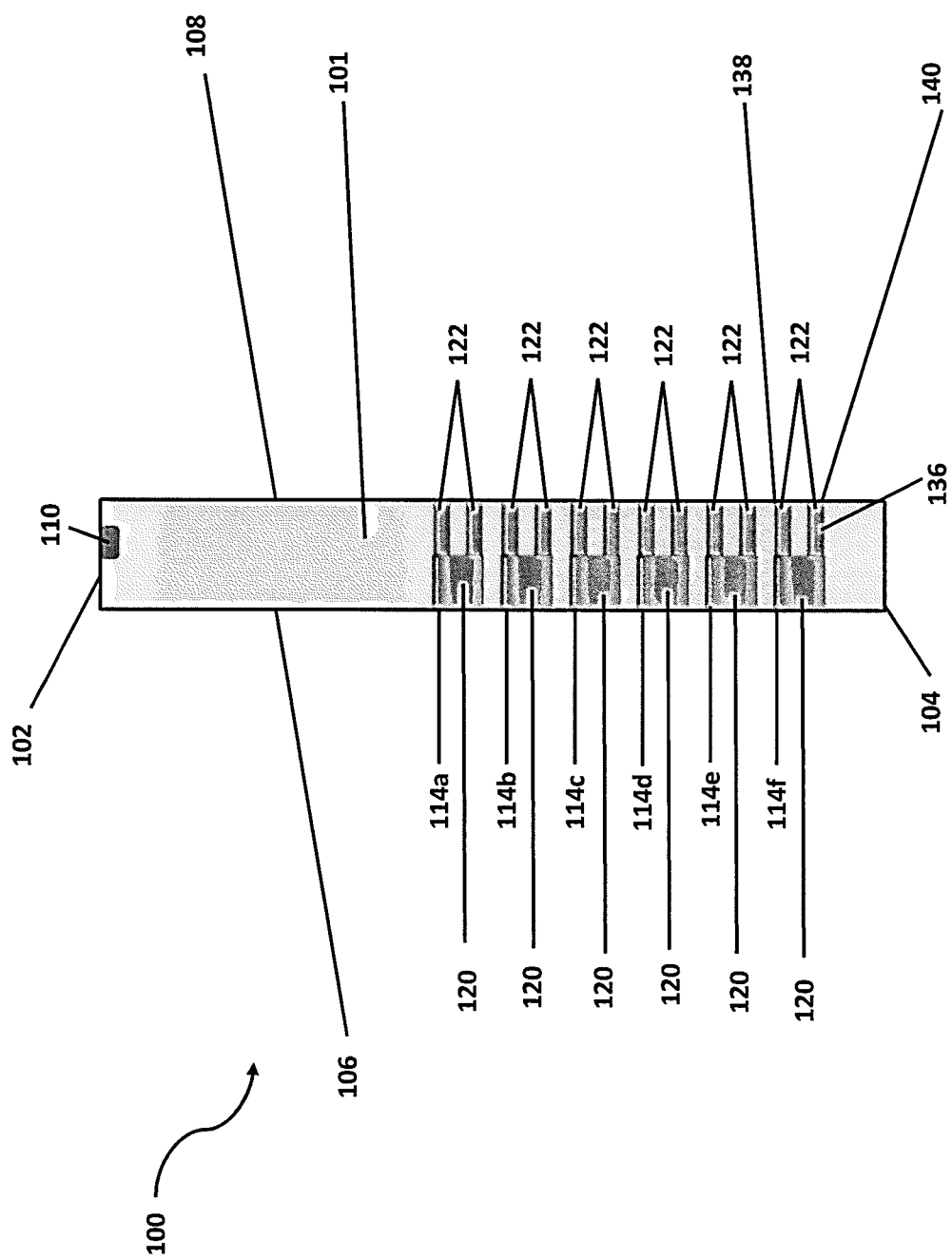
FIG. 5 shows a cross-sectional view of an acoustic absorption liner according to at least one embodiment of the present disclosure.
Figure 6:
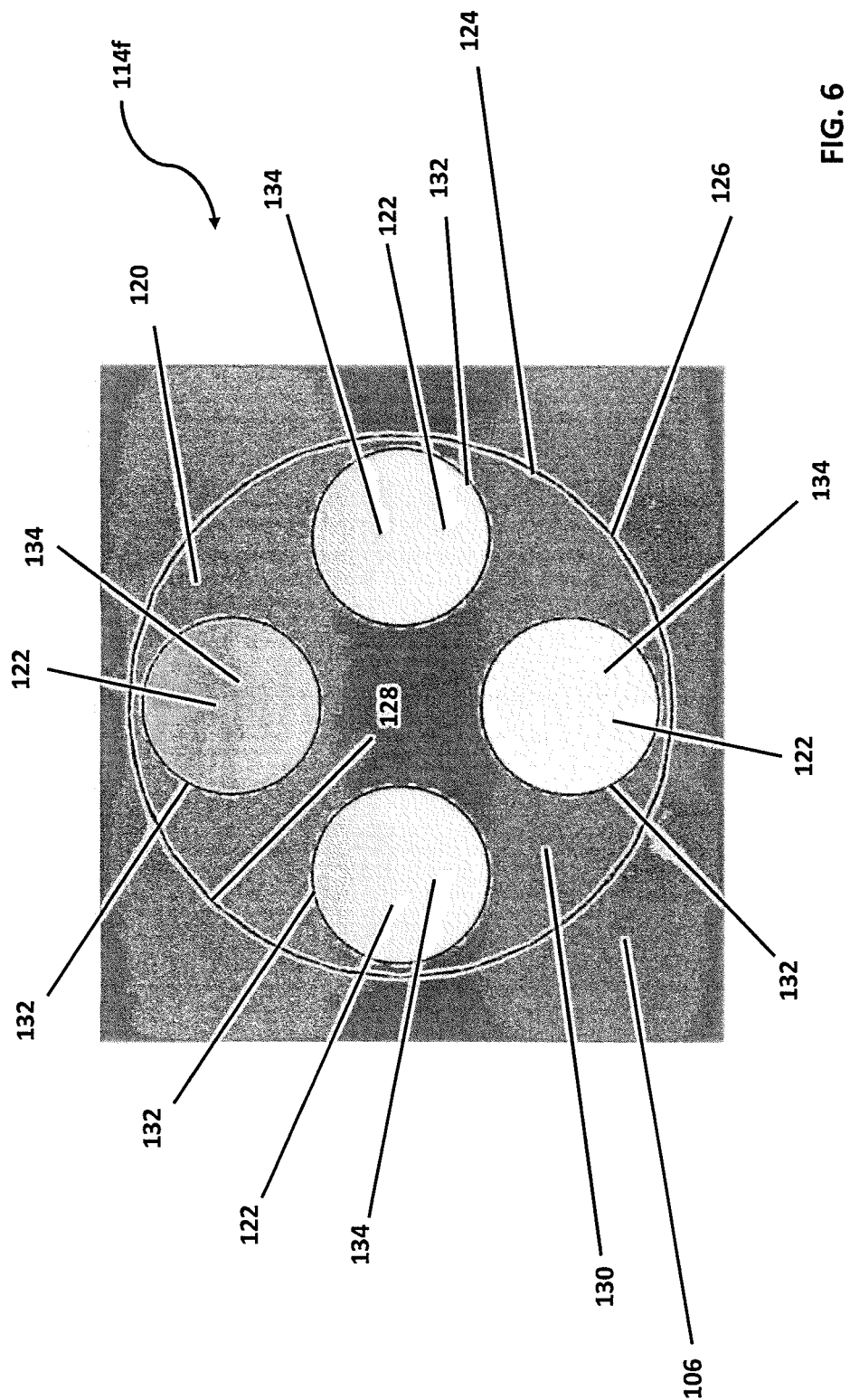
FIG. 6 shows a view of an acoustic absorption liner resonator according to at least one embodiment of the present disclosure.

FIG. 5 shows a cross-sectional view of an acoustic absorption liner according to at least one embodiment of the present disclosure, with the cross section taken on line V-V of FIG. 4. Helmholtz resonators 114a-114f are shown in FIG. 5. FIG. 6 shows a close-up view Helmholtz resonator 114f, viewed from above outer surface 106.

As shown in FIGS. 5-6, each Helmholtz resonator 114 in this embodiment may comprise cavity 120 and a plurality of pores 122. Each cavity 120 is substantially cylindrically shaped, and is recessed into body 101 of acoustic absorption liner 100. Each cavity 120 begins with rim 124 that is coincident with outer surface 106. Each rim 124 defines an opening 126. Each cavity 120 may further comprise internal wall 128 and floor 130.

Each pore 122 is substantially cylindrically shaped. Each pore 122 begins at floor 130 of cavity 120 with first rim 132 that is coincident with floor 130. First rim 132 defines opening 134. Each pore 122 may further comprise internal wall 136. Each pore 122 extends to and ends at inner surface 108 with rim 138 that defines opening 140.

In at least one embodiment of acoustic absorption liner 100 according to the present disclosure, all Helmholtz resonators 114 are uniform in shape and size. Such an embodiment of acoustic absorption liner 100 according to the present disclosure is intended to dampen a single frequency of unwanted acoustic modes, such as, for example, 4 kHz. In at least one embodiment of acoustic absorption liner 100, the Helmholtz resonators 114 are spaced apart 0.25 inches center-to-center and 7.5° azimuthally on outer surface 106. Other arrangements of the Helmholtz resonators 114 are within the scope of the present disclosure.

Figure 7:
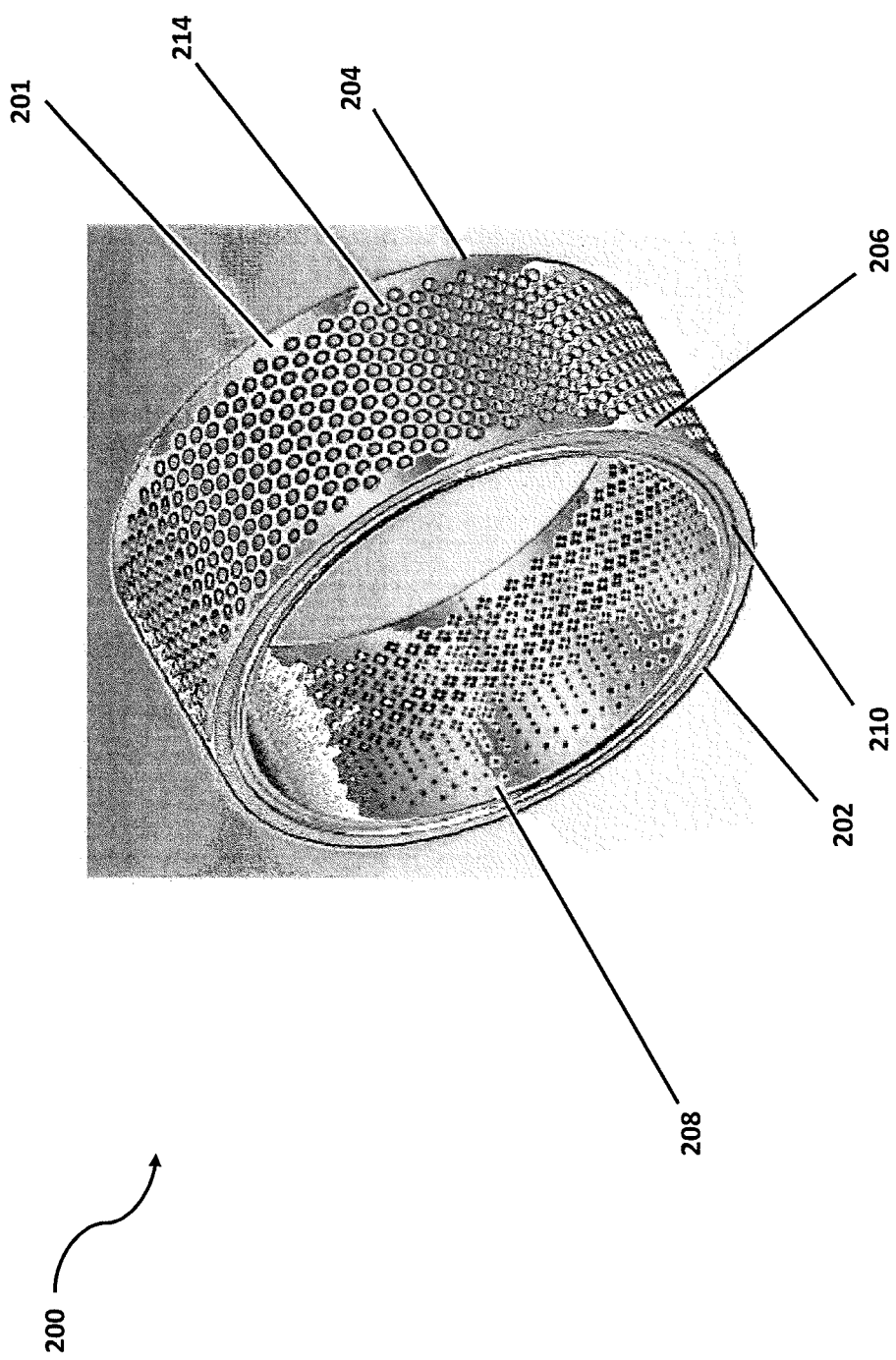
FIG. 7 shows a perspective view of an acoustic absorption liner according to at least one embodiment of the present disclosure.
Figure 8:
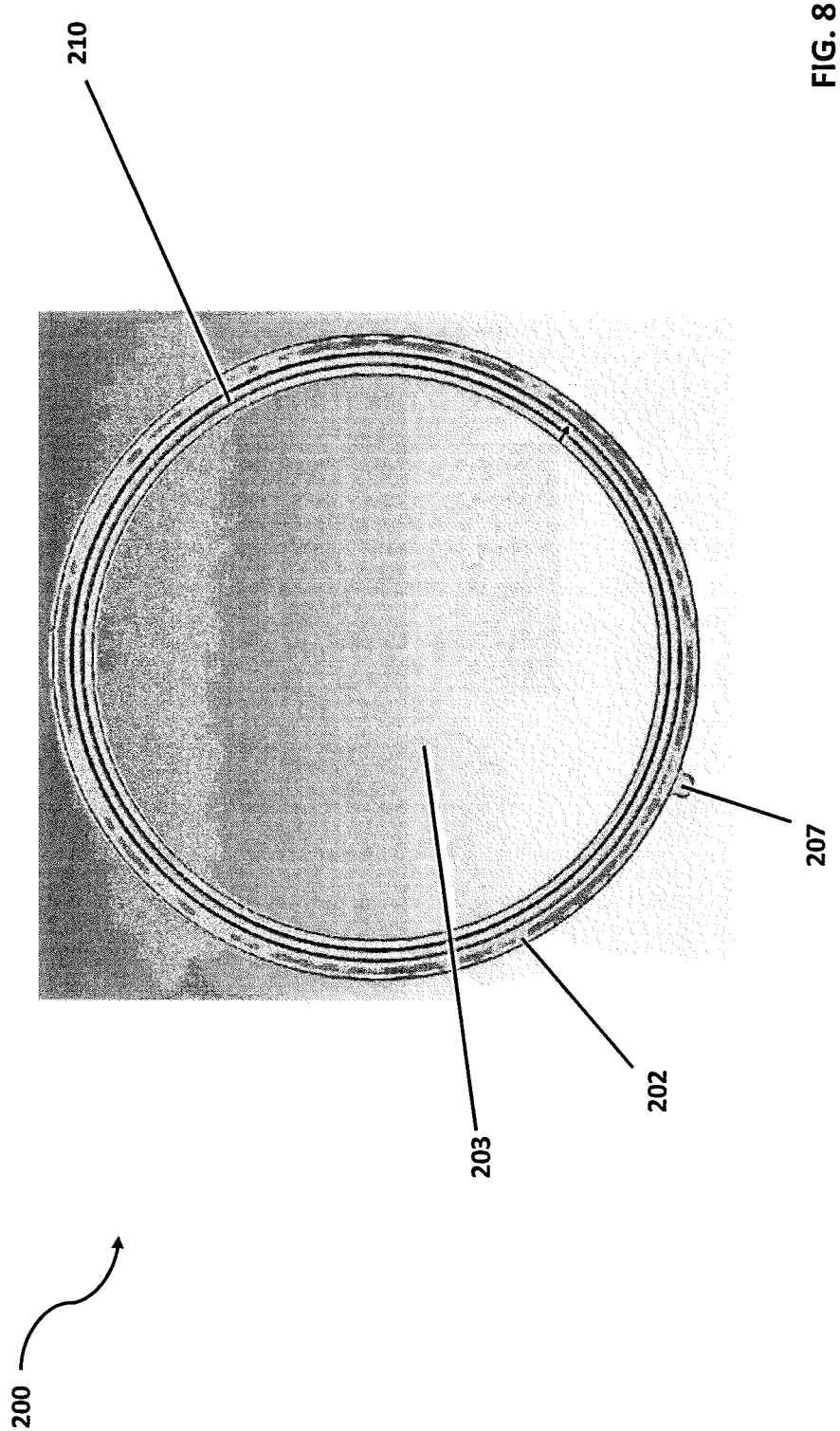
FIG. 8 shows a front view of an acoustic absorption liner according to at least one embodiment of the present disclosure.
Figure 9:
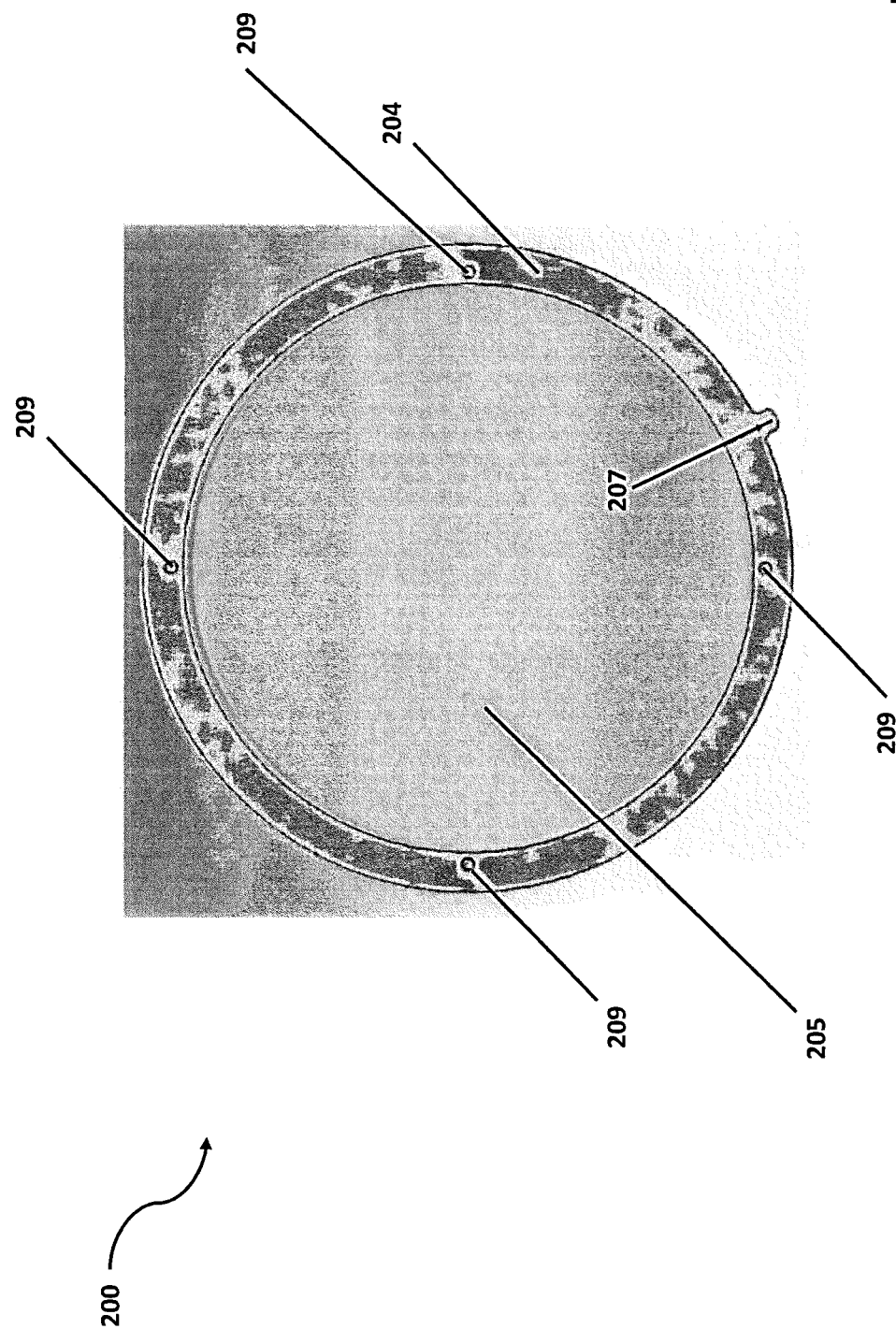
FIG. 9 shows a rear view of an acoustic absorption liner according to at least one embodiment of the present disclosure.
Figure 10:
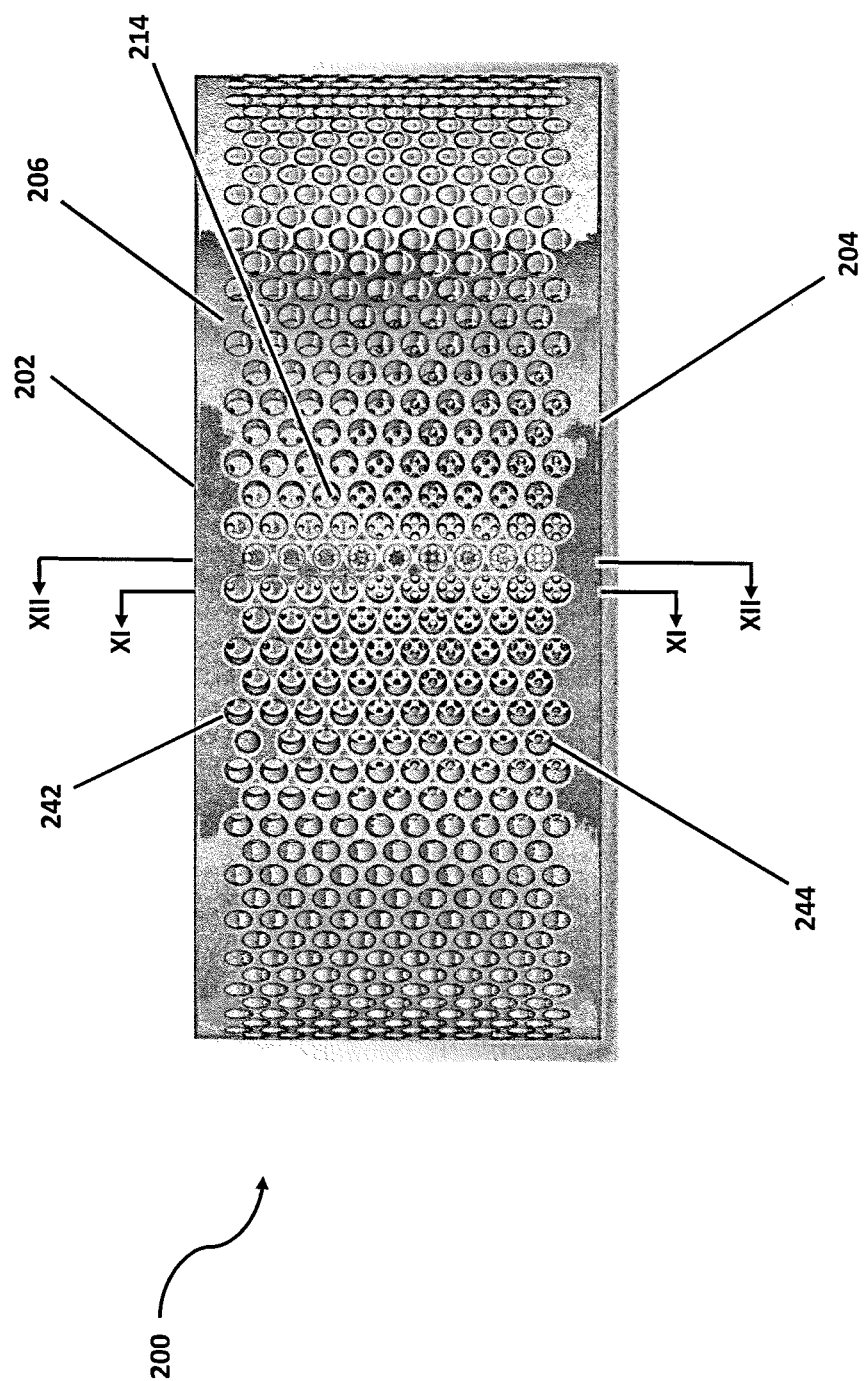
FIG. 10 shows a side view of an acoustic absorption liner according to at least one embodiment of the present disclosure.

FIG. 7 shows a perspective view of acoustic absorption liner 200 according to at least one embodiment of the present disclosure. FIG. 8 shows a front view of acoustic absorption liner 200 according to at least one embodiment of the present disclosure. FIG. 9 shows a rear view of acoustic absorption liner 200 according to at least one embodiment of the present disclosure. FIG. 10 shows a side view of acoustic absorption liner 200 according to at least one embodiment of the present disclosure.

In at least one embodiment, acoustic absorption liner 200 may comprise a substantially cylindrical body 201 comprising first rim 202 and opposing second rim 204, with outer surface 206 and opposing inner surface 208 between first rim 202 and second rim 204. In at least one embodiment, first rim 202 may comprise a circumferential groove 210, into which a gasket material such as an O-ring may later be inserted. In at least one embodiment, second rim 204 may comprise one or more threaded holes 209 distributed around the circumference of second rim 204. First rim 202 defines first opening 203. Second rim 204 defines second opening 205.

In at least one embodiment, acoustic absorption liner 200 also may comprise a plurality of axial rows of Helmholtz resonators 214 arranged around at least a portion of the circumference of acoustic absorption liner 200. In at least one embodiment, acoustic absorption liner 200 also may comprise a plurality of axial rows of Helmholtz resonators 214 arranged around the full circumference of acoustic absorption liner 200. In at least one embodiment, outer surface 206 may comprise clocking tab 207.

Figure 11:
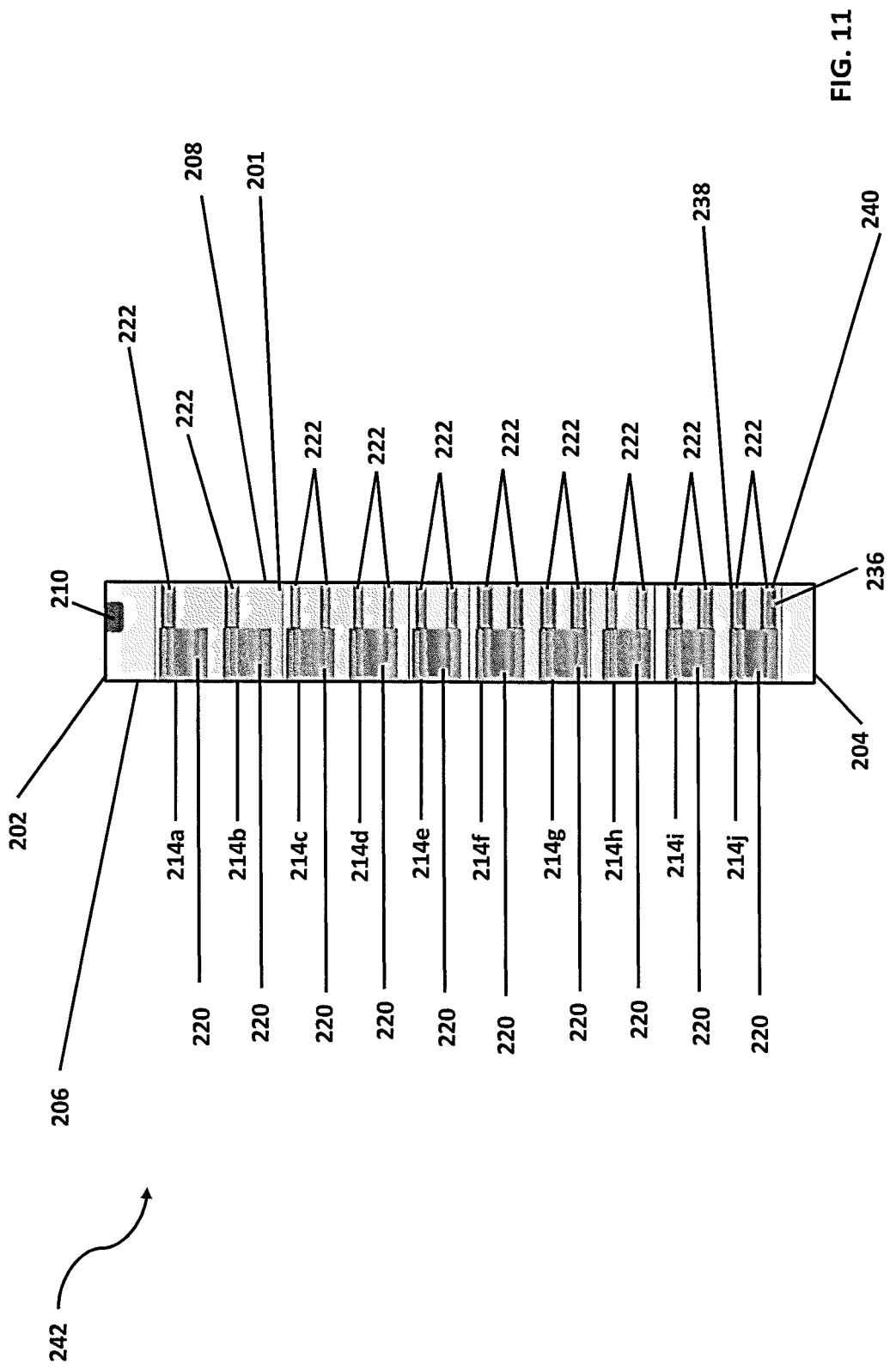
FIG. 11 shows a cross-sectional view of an acoustic absorption liner according to at least one embodiment of the present disclosure.
Figure 12:
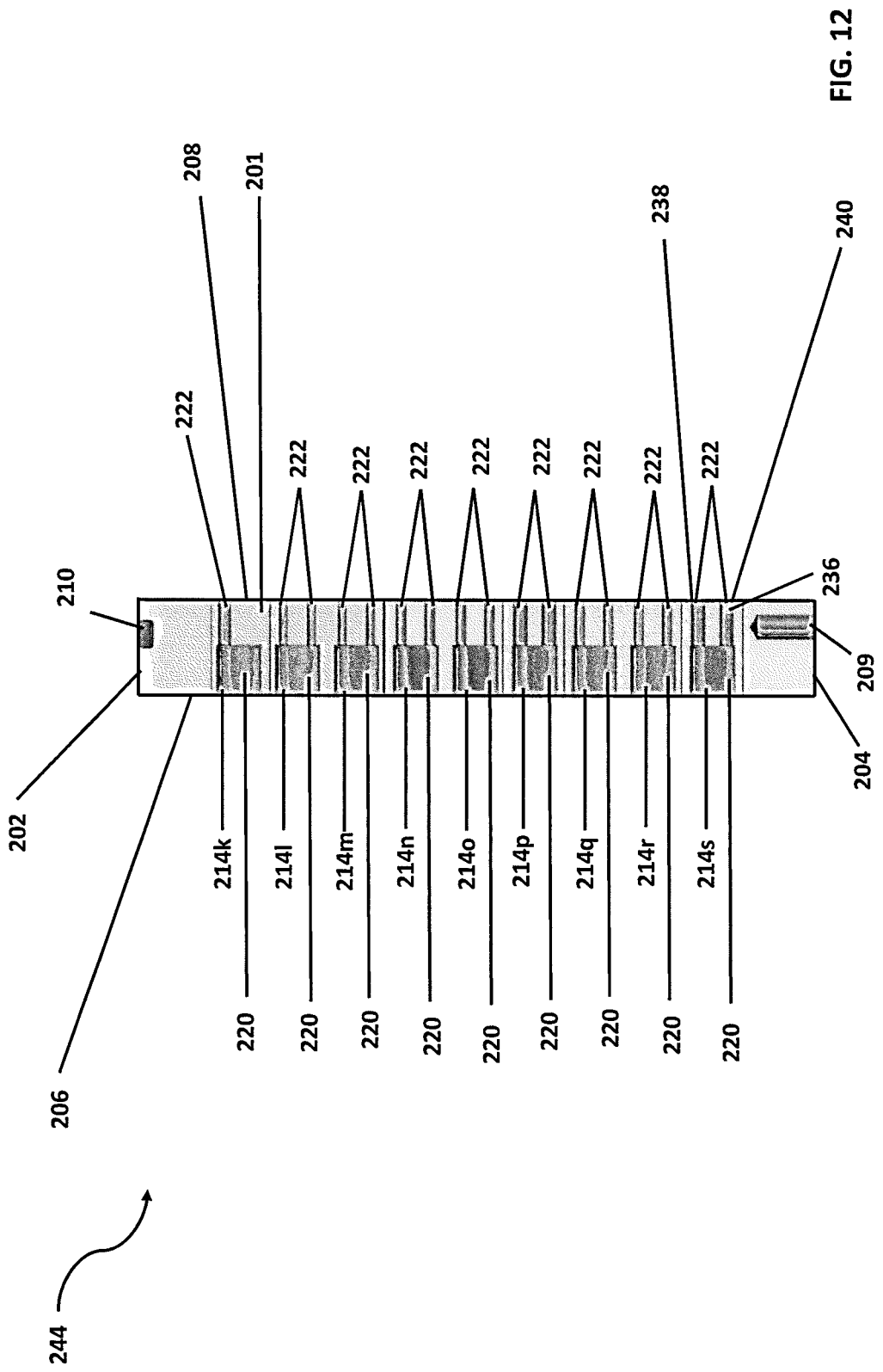
FIG. 12 shows a cross-sectional view of an acoustic absorption liner according to at least one embodiment of the present disclosure.

FIG. 11 shows a cross-sectional view of an acoustic absorption liner according to at least one embodiment of the present disclosure, with the cross section taken on line XI-XI of FIG. 10. Helmholtz resonators 214a-214j are shown in FIG. 11. FIG. 12 shows a cross-sectional view of an acoustic absorption liner according to at least one embodiment of the present disclosure, with the cross section taken on line XII-XII of FIG. 10. Helmholtz resonators 214k-214s are shown in FIG. 12.

Figure 13:
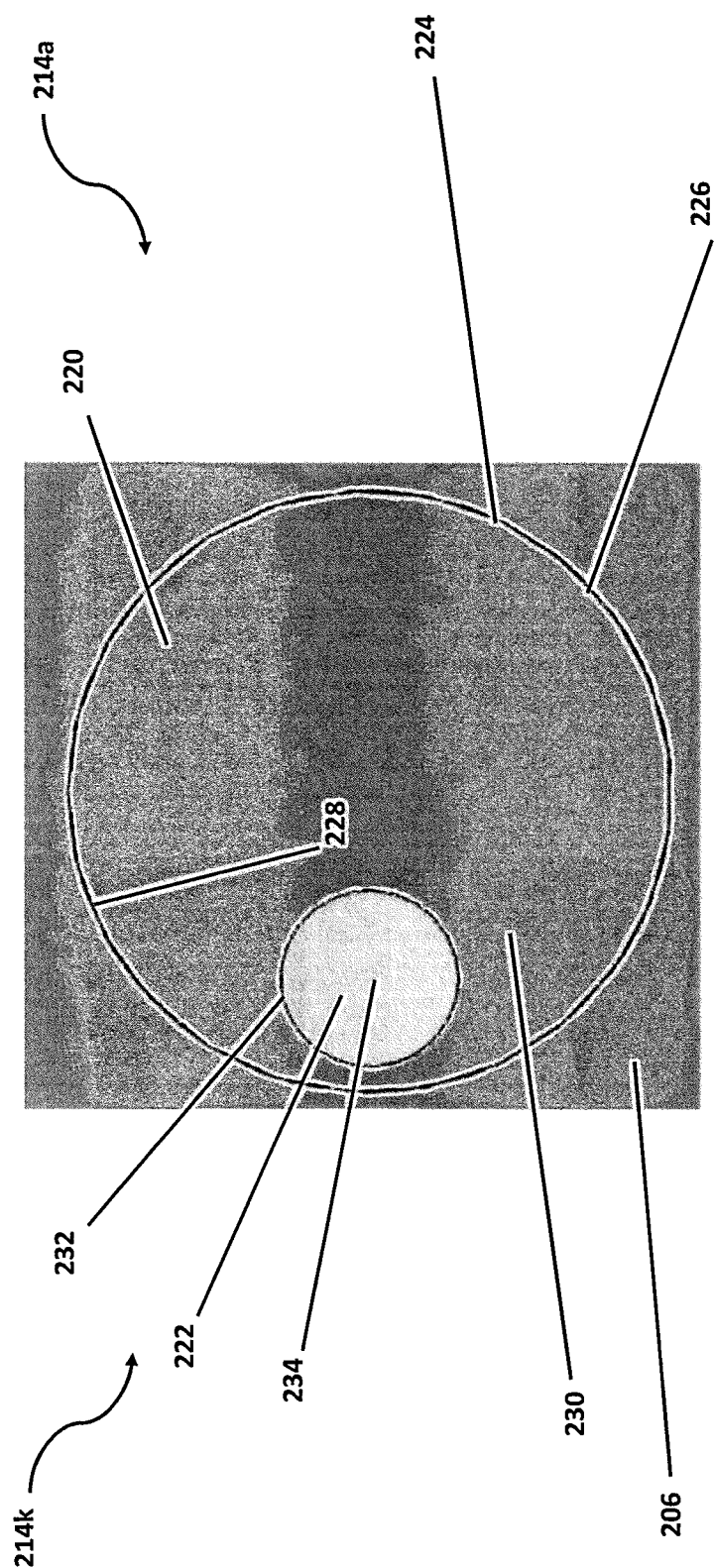
FIG. 13 shows a view of an acoustic absorption liner resonator according to at least one embodiment of the present disclosure.
Figure 14:
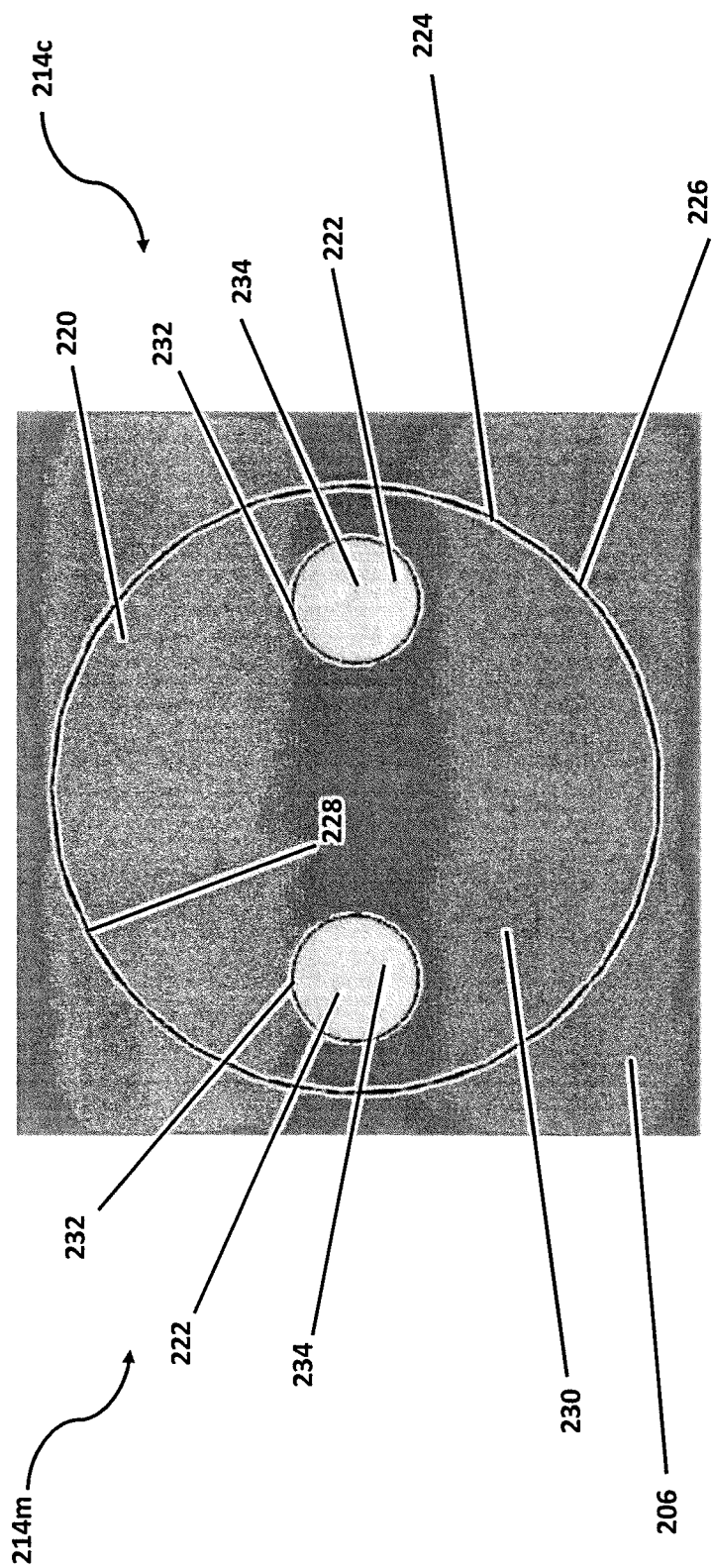
FIG. 14 shows a view of an acoustic absorption liner resonator according to at least one embodiment of the present disclosure.
Figure 15:
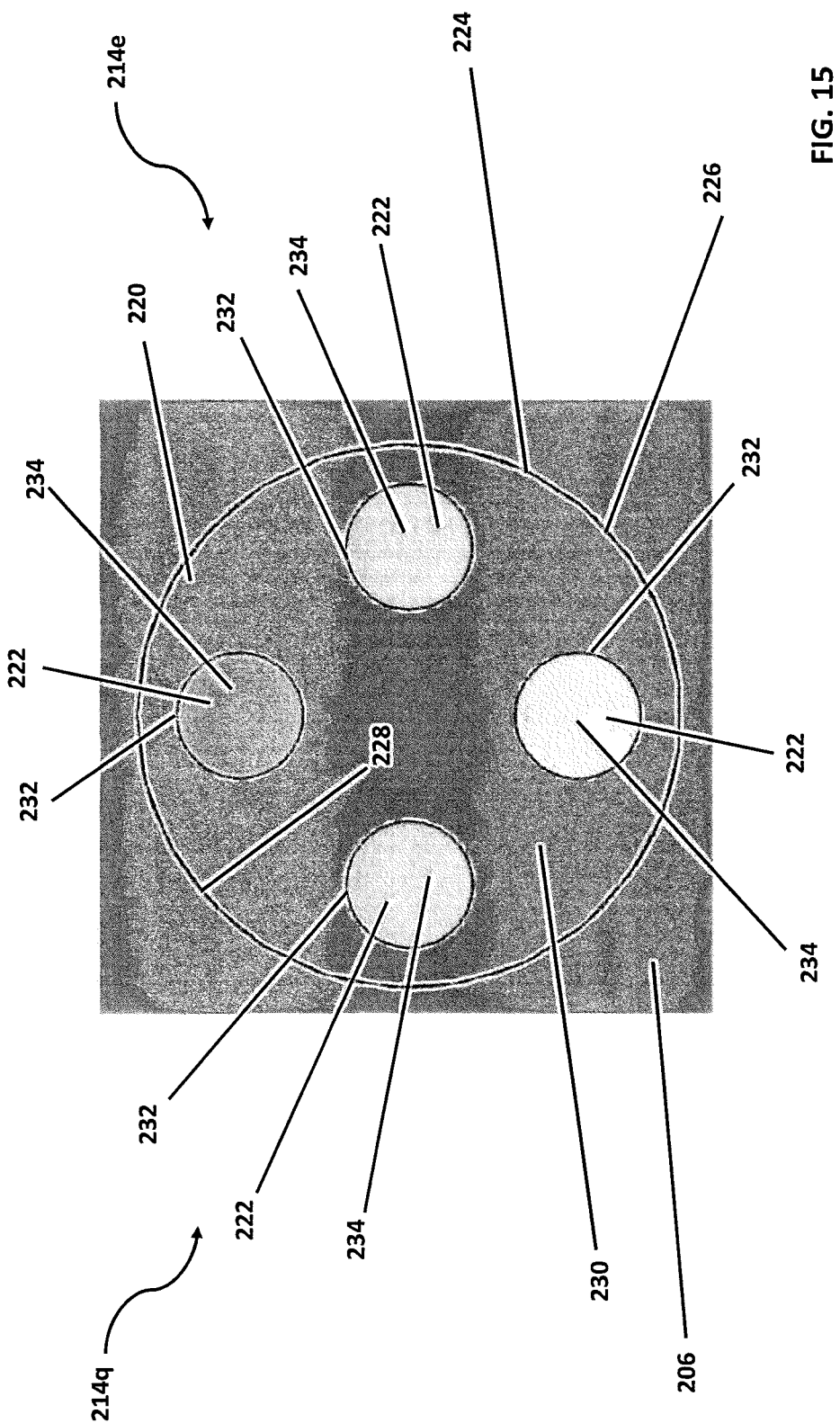
FIG. 15 shows a view of an acoustic absorption liner resonator according to at least one embodiment of the present disclosure.
Figure 16:
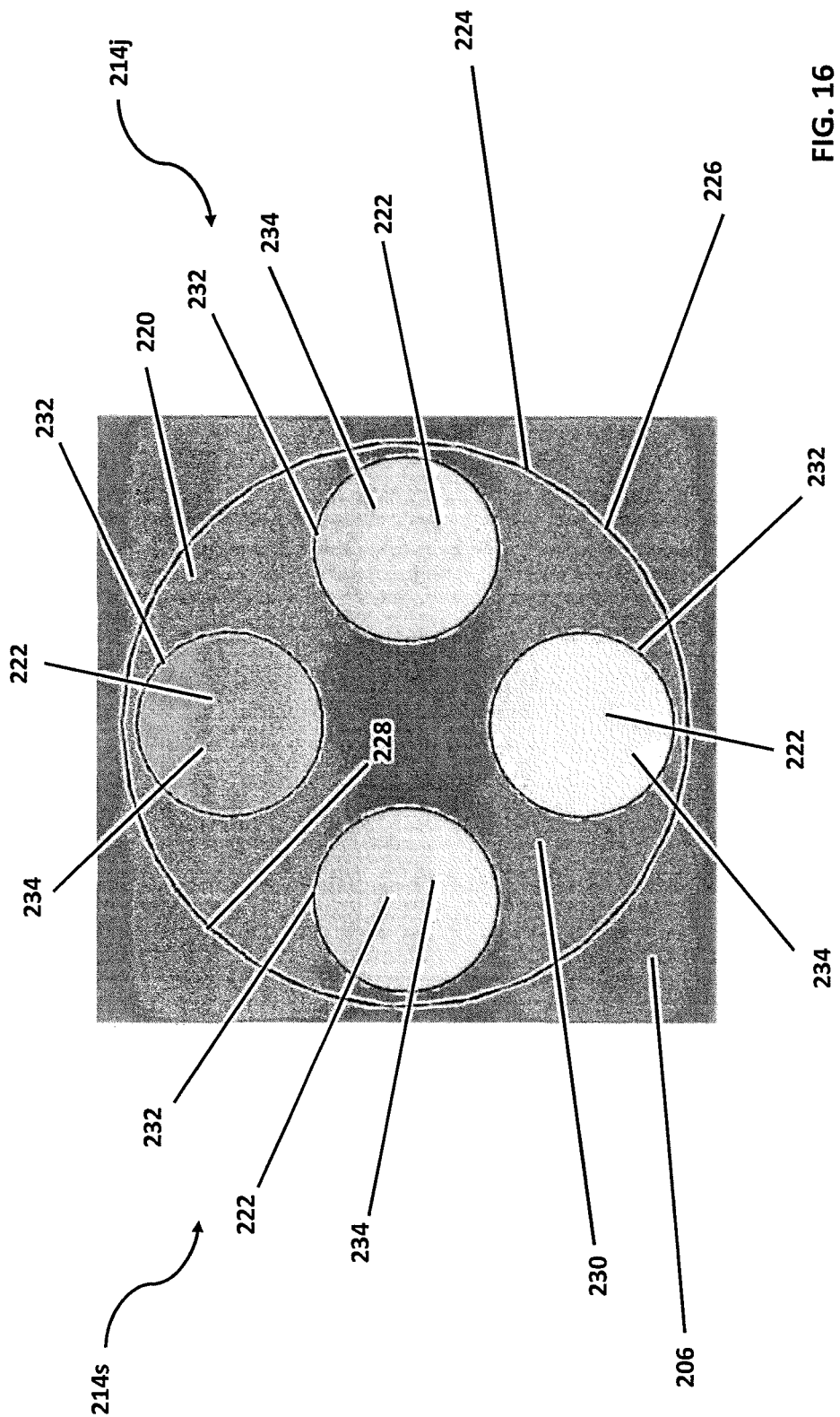
FIG. 16 shows a view of an acoustic absorption liner resonator according to at least one embodiment of the present disclosure.

FIG. 13 shows a close-up view of Helmholtz resonators 214a and 214k (which are identical in the exemplary embodiment of acoustic absorption liner 200 shown in FIGS. 11-13), viewed from above outer surface 206. Helmholtz resonator 214b also has this configuration in the exemplary embodiment of acoustic absorption liner 200 shown in FIGS. 11-13. FIG. 14 shows a close-up view of Helmholtz resonators 214c and 214m (which are identical in the exemplary embodiment shown in FIGS. 11, 12, and 14), viewed from above outer surface 206. Helmholtz resonators 214d and 214l also have this configuration in the exemplary embodiment of acoustic absorption liner 200 shown in FIGS. 11, 12, and 14. FIG. 15 shows a close-up view of Helmholtz resonators 214e and 214q (which are identical in the exemplary embodiment shown in FIGS. 11, 12, and 15), viewed from above outer surface 206. Helmholtz resonators 214h, 214n, 2140, and 214r also have this configuration in the exemplary embodiment of acoustic absorption liner 200 shown in FIGS. 11, 12, and 15. FIG. 16 shows a close-up view of Helmholtz resonators 214j and 214s (which are identical in the exemplary embodiment shown in FIGS. 11, 12, and 16), viewed from above outer surface 206. Helmholtz resonators 214f, 214g, 214i, and 214p also have this configuration in the exemplary embodiment of acoustic absorption liner 200 shown in FIGS. 11, 12, and 16.

As shown in FIGS. 11-16, each Helmholtz resonator 214 in this embodiment may comprise cavity 220 and at least one pore 222. Each cavity 220 is substantially cylindrically shaped, and is recessed into body 201 of acoustic absorption liner 200. Each cavity 220 begins with rim 224 that is coincident with outer surface 206. Each rim 224 defines an opening 226. Each cavity 220 may further comprise internal wall 228 and floor 230.

Each pore 222 is substantially cylindrically shaped. Each pore 222 begins at floor 230 of cavity 220 with first rim 232 that is coincident with floor 230. First rim 232 defines opening 234. Each pore 222 may further comprise internal wall 236. Each pore 222 extends to and ends at inner surface 208 with rim 238 that defines opening 240.

In at least one embodiment, acoustic absorption liner 200 is designed for targeted acoustic damping of multiple frequencies, such as 2 kHz, 3 kHz, and 4 kHz. In such an embodiment, thermal management is given a lower priority in favor of greater potential for acoustic control. In at least one embodiment of acoustic absorption liner 200, the Helmholtz resonators 214 are spaced apart 0.25 in. axially and 3.75° azimuthally. In at least one embodiment of acoustic absorption liner 200, the Helmholtz resonators 214 are arranged in alternating axial rows 242 and 244. In at least one embodiment of acoustic absorption liner 200, the Helmholtz resonators 214 in axial rows 244 are offset by an additional 0.125 in. axially to allow for the denser packaging of the Helmholtz resonators 214. Other arrangements of the Helmholtz resonators 214 are within the scope of the present disclosure.

In at least one embodiment, acoustic absorption liner 200 is designed to be an axially-progressive configuration, with the lowest frequency (e.g., 2 kHz) Helmholtz resonators 214 located in the detonation region nearer first rim 202. Moving toward second rim 204, the target frequency increased to higher frequency (e.g., 3 kHz and 4 kHz) Helmholtz resonators 214.

Referring back to FIGS. 11 and 12, in that exemplary embodiment of acoustic absorption liner 200, (a) Helmholtz resonators 214a, 214b, and 214k are one-pore Helmholtz resonators targeting unwanted 2 kHz frequency audio modes; (b) Helmholtz resonators 214c, 214d, 214l, and 214m are two-pore Helmholtz resonators targeting unwanted 2 kHz frequency audio modes; (c) Helmholtz resonators 214e, 214h, 214n, 2140, 214q, and 214r are two-pore Helmholtz resonators targeting unwanted 3 kHz frequency audio modes; and (d) Helmholtz resonators 214f, 214g, 214i, 214j, 214p, and 214s are two-pore Helmholtz resonators targeting unwanted 4 kHz frequency audio modes. Such an embodiment of acoustic absorption liner 200 according to the present disclosure is intended to dampen multiple frequencies of unwanted acoustic modes, such as, for example, 2 kHz, 3 kHz, and 4 kHz. Other combinations and arrangements of Helmholtz resonators 214 are within the scope of the present disclosure.

While the present disclosure has been illustrated and described in detail in the drawings and foregoing description, the same is to be considered as illustrative and not restrictive in character, it being understood that only certain embodiments have been shown and described, and that all changes and modifications that come within the spirit of the present disclosure are desired to be protected.

What is claimed is:

1. An acoustically absorptive liner device for a rotating detonation combustor, the acoustically absorptive liner device comprising:
   a cylindrically shaped body, the cylindrically shaped body comprising an outer surface, an inner surface, a first open end, and a second open end; and
   a plurality of Helmholtz resonators formed in said cylindrically shaped body, wherein each said Helmholtz resonator comprises a cylindrically shaped cavity open to said outer surface and having a rim coincident with said outer surface and at least one cylindrically shaped pore open at a first end to said cylindrically shaped cavity and open at a second end to said inner surface, thereby forming an acoustic conduit between said inner surface and said outer surface.

2. The acoustically absorptive liner device of claim 1, wherein said plurality of Helmholtz resonators are arranged in axial rows in said cylindrically shaped body.

3. The acoustically absorptive liner device of claim 2, wherein said axial rows are arranged around a full circumference of said cylindrically shaped body.

4. The acoustically absorptive liner device of claim 1, wherein said plurality of Helmholtz resonators comprises at least one first configuration Helmholtz resonator and at least one second configuration Helmholtz resonator.

5. The acoustically absorptive liner device of claim 4, wherein said at least one first configuration Helmholtz resonator is configured to dampen a first frequency.

6. The acoustically absorptive liner device of claim 5, wherein said at least one second configuration Helmholtz resonator is configured to dampen a second frequency.

7. The acoustically absorptive liner device of claim 4, wherein said plurality of Helmholtz resonators further comprises at least one third configuration Helmholtz resonator.

8. The acoustically absorptive liner device of claim 7, wherein said at least one third configuration Helmholtz resonator is configured to dampen a third frequency.

9. The acoustically absorptive liner device of claim 7, wherein said plurality of Helmholtz resonators comprises at least one fourth configuration Helmholtz resonator.

10. The acoustically absorptive liner device of claim 9, wherein said at least one fourth configuration Helmholtz resonator is configured to dampen a fourth frequency.

11. The acoustically absorptive liner device of claim 4, wherein said plurality of Helmholtz resonators are arranged in axial rows in said cylindrically shaped body and said at least one first configuration Helmholtz resonator and said at least one second configuration Helmholtz resonator are intermixed in said axial rows.

12. The acoustically absorptive liner device of claim 11, wherein said plurality of Helmholtz resonators further comprises at least one third configuration Helmholtz resonator, and wherein said at least one third configuration Helmholtz resonator is intermixed in said axial rows with said at least one first configuration Helmholtz resonator and said at least one second configuration Helmholtz resonator.

13. The acoustically absorptive liner device of claim 12, wherein said at least one first configuration Helmholtz resonator and said at least one second configuration Helmholtz resonator and said at least one third configuration Helmholtz resonator are configured to dampen at least three different frequencies.

14. A rotating detonation combustor, the rotating detonation combustor comprising:
an acoustically absorptive liner device comprising a cylindrically shaped body, the cylindrically shaped body comprising an outer surface, an inner surface, a first open end, and a second open end, and at least one Helmholtz resonator formed in said cylindrically shaped body, wherein each said at least one Helmholtz resonator comprises a cylindrically shaped cavity open to said outer surface and having a rim coincident with said outer surface, and at least one cylindrically shaped pore open at a first end to said cylindrically shaped cavity and open at a second end to said inner surface, thereby forming an acoustic conduit between said inner surface and said outer surface.

15. The rotating detonation combustor of claim 14, comprising wherein said at least one Helmholtz resonator comprises a plurality of said Helmholtz resonators arranged in axial rows in said cylindrically shaped body.

16. The rotating detonation combustor of claim 15, wherein said axial rows are arranged around a full circumference of said cylindrically shaped body.

17. The rotating detonation combustor of claim 14, wherein each said at least one Helmholtz resonator is configured to dampen a preselected frequency.

18. The acoustically absorptive liner device of claim 14, wherein said at least one Helmholtz resonator comprises at least one first configuration Helmholtz resonator and at least one second configuration Helmholtz resonator.

19. The acoustically absorptive liner device of claim 18, wherein said at least one first configuration Helmholtz resonator is configured to dampen a first frequency.

20. The acoustically absorptive liner device of claim 19, wherein said at least one second configuration Helmholtz resonator is configured to dampen a second frequency.

21. The acoustically absorptive liner device of claim 18, wherein said at least one Helmholtz resonator further comprises at least one third configuration Helmholtz resonator.

22. The acoustically absorptive liner device of claim 21, wherein said at least one third configuration Helmholtz resonator is configured to dampen a third frequency.

23. The acoustically absorptive liner device of claim 21, wherein said at least one Helmholtz resonator comprises at least one fourth configuration Helmholtz resonator.

24. The acoustically absorptive liner device of claim 23, wherein said at least one fourth configuration Helmholtz resonator is configured to dampen a fourth frequency.

25. The acoustically absorptive liner device of claim 18, wherein said at least one Helmholtz resonator comprises a plurality of said Helmholtz resonators arranged in axial rows in said cylindrically shaped body and said at least one first configuration Helmholtz resonator and said at least one second configuration Helmholtz resonator are intermixed in said axial rows.

26. The acoustically absorptive liner device of claim 25, wherein said at least one Helmholtz resonator further comprises at least one third configuration Helmholtz resonator, and wherein said at least one third configuration Helmholtz resonator is intermixed in said axial rows with said at least one first configuration Helmholtz resonator and said at least one second configuration Helmholtz resonator.

27. The acoustically absorptive liner device of claim 26, wherein said at least one first configuration Helmholtz resonator and said at least one second configuration Helmholtz resonator and said at least one third configuration Helmholtz resonator are configured to dampen at least three different frequencies.

* * * * *